United States Patent Office 3,514,439
Patented May 26, 1970

3,514,439
1:2 HOMOGENEOUS COBALT COMPLEXES OF PHENYL-AZO-PHENOL, PHENYL-AZO-NAPHTHOL OR PHENYL-AZO PYRAZOLONE DYES HAVING BOUND TO THE PHENYL NUCLEUS AN ANILINO OR NAPHTHYLAMINO SUBSTITUENT
Walter Wehrli, Riehen, Basel-Stadt, and Heinz Wicki, Allschwil, Basel-Land, Switzerland, assignors to Sandoz Ltd. (also known as Sandoz A.G.), Basel, Switzerland
No Drawing. Filed July 6, 1966, Ser. No. 563,080
Claims priority, application Switzerland, July 6, 1965, 9,456/65
Int. Cl. C09b 45/12; D06p 1/10
U.S. Cl. 260—147                    8 Claims

ABSTRACT OF THE DISCLOSURE

1:2 homogeneous cobalt complexes of phenyl-azophenyl and phenyl-azo-naphthyl dyes, having bound at the ortho position to one phenyl nucleus either an anilino or a naphthylamino substituent, are useful for dyeing wool, silk, leather, polyamide fibers and natural and regenerated cellulose fibers with good fastness to light, washing, perspiration, gas fumes, acids, alkalis, water, sea water, carbonising, bleaching, milling, rubbing, pressing, stoving and cross dyeing.

---

This invention relates to cobalt complex dyes of the azo series. In the metal-free state these dyes have the formula:

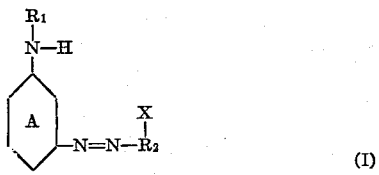

(I)

In this formula:
$R_1$ represents a hydrocarbon radical which may be substituted,
$R_2$ the radical of a coupling component, and
X a group which is metallisable in the adjacent position to the azo group. The ring A may contain further substituents if desired.

Dyes especially preferred are those which, unmetallised, have the formula:

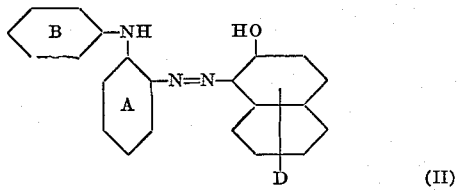

(II)

or the formula:

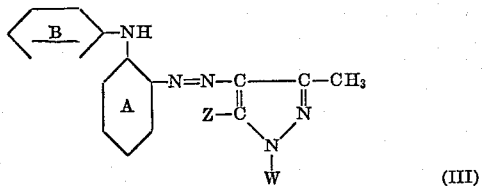

(III)

In Formulae II and III the rings A, B and D may be substituted or unsubstituted. All the rings may bear, in addition, non-water-solubilising substituents, for example alkyl or alkoxy groups, halogen atoms, carboxylic acid ester, acylamino, nitro, cyano, hydroxyl or amino groups. W denotes a hydrogen atom or a substituted or unsubstituted hydrocarbon radical and Z the hydroxyl group or an amino group. When W stands for aryl, it is preferable for at least one of the rings A and W to be substituted by a water-solubilising group, for example a sulphonic acid, carboxylic acid, sulphonamide, carbonamide or an organic sulphonyl group.

The rings A, B and D contain preferably sulphonic acid, carboxylic acid, sulphonic acid amide or carboxylic acid amide groups, mono- or di-substituted sulphonic acid amide groups or carboxylic acid amide groups; for example, a sulphonic acid amide or carboxylic acid amide group substituted by one or two methyl, ethyl or hydroxyethyl groups or by a phenyl radical which also may be substituted; alkylsulphonyl groups with, for example, 1 to 4 or more particularly 1 to 2 carbon atoms; arylsulphonyl groups, notably substituted or unsubstituted phenylsulphonyl groups; alkyl or alkoxy groups having 1 to 5 carbon atoms, e.g. methyl, ethyl, isopropyl, n-propyl, n-butyl, isobutyl, n-amyl, isoamyl, methoxy, ethoxy or n-butoxy; halogen atoms, such as chlorine, bromine or fluorine atoms; nitro or hydroxy groups; free amino groups or substituted amino groups, e.g. acylamino groups such as lower alkanoylamino groups, lower alkylamino groups or arylamino groups, e.g. phenylamino or alkylphenylamino groups.

A process for the production of dyes of Formula I consists in diazotising an amino of formula:

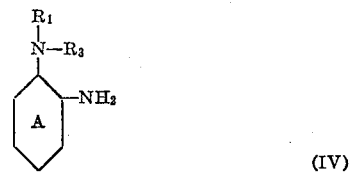

(IV)

where $R_3$ represents an acyl group, and coupling with a compound of formula:

(V)

in the adjacent position to X, followed by cleavage of the acyl radical $R_3$ in the resulting coupling product and formation of the cobalt complex compound in substance or on the fibre.

The acyl radical $R_3$ is preferably lower alkanoyl, e.g. formyl, acetyl, propionyl, or butyryl; lower alkoxycarbonyl, e.g. ethoxycarbonyl or methoxycarbonyl; arylcarbonyl, e.g. benzoyl, methylbenzoyl or chlorobenzoyl; lower alkylsulphonyl, e.g. methylsulphonyl or ethylsulphonyl; arylsulphonyl, e.g. phenylsulphonyl or methylphenylsulphonyl or —$SO_3H$.

Suitable diazo components of Formula IV may contain as substituent $R_1$, e.g., a substituted or unsubstituted alkyl radical, e.g. methyl, ethyl, butyl, 2-hydroxyethyl, 2-methoxyethyl, 2-ethoxyethyl, 3-methoxybutyl, a substituted or unsubstituted aralkyl or cycloalkyl radical, e.g. benzyl, phenylethyl, cyclohexyl, 4-methylcyclohexyl, or preferably a mononuclear, substituted or unsubstituted aryl radical, e.g. phenyl, methylphenyl, dimethylphenyl, ethylphenyl, chlorophenyl, bromophenyl, fluorphenyl, methoxyphenyl, ethoxyphenyl or nitrophenyl. $R_1$ may also be a substituted or unsubstituted naphthyl radical.

Examples of suitable coupling components of formula V are aromatic hydroxy compounds, such as 4-methyl-1-hydroxybenzene, 1,3-dihydroxybenzene, 2-hydroxynaphthalene, 1-hydroxy-4-methoxynaphthalene, 1-hydroxy-5,8-dichloronaphthalene, 2-hydroxy-8-acetylamino- or -8-methylsulphonylaminonaphthalene, 1 - hydroxynaphthalene-4- or -5-sulphonic acid, 2-hydroxynaphthalene-4-, -6- or -7-sulphonic acid or -6- or -7-sulphonic acid amide, 1 - hydroxy-6- or -7-amino, methylamino-, phenylamino, (4' - methoxyphenylamino)-, -(2',4',6' - trimethylphenylamino) - naphthalene - 3 - sulphonic acid, 1-hydroxy - 8 - acetylaminonaphthalene - 3,6 - or - 3,5 - disulphonic acid amide; aromatic compounds having a primary or secondary amino group, such as 1,3-diaminobenzene, 1-aminonaphthalene-4-sulphonic acid, 2-amino-, 2-phenylamino-1 or 2-methylamino-5-hydroxynaphthalene-7-sulphonic acid, 2-amino-, 2-phenylamino-, 2-(2', 4', 6'-trimethylphenylamino)- or 2-methylamino - 8 - hydroxynaphthalene-6-sulphonic acid; 5- pyrazolones or 5-aminopyrazoles, such as 1-phenyl-3-methyl-5-pyrazolone or its -3'- or -4'-sulphonic acids; 1-(2', 5'-dichlorophenyl)- or 1-(2'-chloro-6'-methylphenyl)-3- methyl - 5 - pyrazolone-4'-sulphonicacid, 1-(2'-chlorophenyl)-3-methyl - 5 - pyrazolone-5'-sulphonic acid, 1-(3'-aminosulphonylphenyl)-3-methyl-5-pyrazolone, 1-phenyl-3-methyl-5-aminapyrazole or its -3'- or -4'-sulphonic acids or -3'-sulphonic acid amide; acylacetyl derivatives, such as acetoacetylaminobenzene or its -3- or -4-sulphonic acids, 1-acetoacetylaminonaphthalene - 4 - or - 5- sulphonic acid, 2 - acetoacetylaminonaphthalene-5-, -6- or -7-sulphonic acid, 1-acetoacetylamino-2-ethylhexane, 1 - acetoacetylambinobutane; and barbituric acid.

The starting amines of Formula (IV) can be produced in accordance with the particulars given in the Journal of the American Chemical Society 75, p. 6336, 1953.

The amine of Formula IV is best diazotised in the temperature range of 0° to 10° C., or preferably 0-5° C. The coupling reaction can be conveniently carried out at 0° to 60° C. in acid, neutral or alkaline medium, e.g. at 0°-20° C. in a weakly acid, neutral or alkaline medium when the substituent X is an enolic or phenolic hydroxyl group, and at 15-60° C. in acid medium when the substituent X is an unsubstituted of monosubstituted amino group.

The acyl group can be split off by heating the azo dye in the presence of a dilute mineral acid, e.g. 2–10% hydrochloric acid or sulphuric acid, at 70-120° C. or, preferably, 90-100° C., and if necessary under pressure, or in the presence of a solution of an alkali metal hydroxide, e.g. 2-15% sodium or potassium hydroxide solution, at 70-120° C. For this purpose an aqueous, aqueous-organic or organic medium can be used, e.g. an aqueous medium when the dye contains water-solubilising groups, such as $SO_3H$, or in the case of alkaline hydrolysis, COOH or $-SO_2-NH_2$, or in aqueous-organic or organic medium when the dye is virtually insoluble or sparingly soluble in water. Examples of suitable organic solvents are alcohols, such as methanol, ethanol, isopropanol, n-propanol, 2-methoxy- or 2-ethoxy-ethanol, 2-(2'-ethoxy)ethoxyethanol; ethers, such as dioxan; or, in the case of acid hydrolysis, carboxylic acids, e.g. acetic or propionic acid.

When the substitutent $R_3$ is an alkylsulphonyl or arylsulphonyl group, hydrolysis is effected to best advantage in a concentrated mineral acid, e.g. in boiling 20-35% hydrochloric acid or boiling 400-50% hydrobromic acid, or in about 70-85% sulphuric acid at 100-150°.

After cleavage of the radical $R_3$ the metallisable azo dyes, if preferred after neutralisation of the hydrolysing solution, are precipitated by dilution with water or by the addition of salt filtered off and dried.

The dyes of Formula I can be produced yet more advantageously by diazotising an amine of formula:

(VI)

where halogen represents preferably chlorine or bromine, coupling with a compound of formula:

(VII)

and condensing the resulting azo compound with an amine of formula:

(VIII)

The condensation reaction can be perfomed very expediently with the addition of metals or metal salts, especially copper salts, and of basic condensing agents if required, e.g. sodium carbonate. In this case the copper complexes of the dyes of Formula I are obtained, which can be readily demetallised by treatment with acids, e.g. sulphuric acid, and subsequently converted into the cobalt complexes.

The final dyes obtained can be applied to wool, polyamide fibres, cotton, regenerated cellulose fibers and other suitable textile fibers by exhaustion dyeing methods, and the dyeings subsequently metallised by treatment with cobalt compounds. Alternatively, the dyes can be metallised in substance, e.g. in aqueous solution or an organic medium, such as formamide or in a concentrated aqueous solution of an alkali metal salt of a lower aliphatic monocarboxylic acid. It is of advantage to allow an amount of a cobalt-yielding agent containing less than two but at least one atom of cobalt to act upon two molecules of the monoazo dye. Examples of suitable cobalt compounds are cobaltous formate, cobaltous acetate and cobaltous sulphate. When the metallising reaction is carried out in the concentrated aqueous solution of an alkali metal salt of a lower aliphatic monocarboxylic acid, water-insoluble cobalt compounds such as cobalt hydroxide or cobalt carbonate can be used.

It is of special advantage to carry out metallisation in an aqueous or alkaline medium, to which the metal compounds are added in the presence of compounds which maintain the metals dissolved in complex combination in caustic-alkaline medium, e.g. tartaric, citric or lactic acid.

The resulting cobalt complex compounds, if desired after the addition of the organic metallising solution to water, are precipitated from aqueous medium by the addition of salt, filtered off, washed if necessary and dried.

The cobalt-containing azo dyes thus obtained are homogeneous metal complex compounds in which essentially one atom of cobalt is bound to two molecules of the monoazo compound, i.e. 1:2 complexes in which one molecule of monoazo compound is bound to approximately 0.3 to 0.7 atoms of metal.

These cobalt-containing azo dyes dye wool, silk, leather and polyamide fibres from a neutral or acid dyebath, and natural and regenerated cellulosic fibres from a neutral or alkaline dyebath. Those which are sufficiently soluble in organic solvents can be used for the spin dyeing of fibre-forming materials in solution in organic solvents and for the pigmentation of surface coatings and plastics. The dyeings and coatings thus produced have good fastness to light, washing, perspiration, gas fumes, acids, alkalis, water, sea water, carbonising, bleaching, milling, rubbing, pressing, stoving and cross dyeing.

In the following examples the parts and percentages are by weight and the temperatures in degrees centigrade.

EXAMPLE 1

22.6 parts of 2-amino-N-acetyl-1,1'-diphenylamine are dissolved in 1000 parts of water and 35 parts of 30% hydrochloric acid. The solution is cooled to 0-5° C. and a solution of 6.9 parts of sodium nitrite in 20 parts of water is added with stirring. The pale yellow diazo solution thus formed is dropped into a solution of 25.3 parts of 1-(3'-aminosulphonylphenyl)-3-methyl-5 - pyrazolone in 200 parts of water and 13.5 parts of 30% sodium hydroxide solution at 0-5° with good stirring. The coupling mixture is maintained at pH 9.5-10 by adding 20% sodium carbonate solution as necessary. On completion of the coupling reaction the dye is salted out by the addition of hydrochloric acid, filtered off, washed with water and dried. The dry yellow dye is disssolved in 160 parts of ethanol, to which are added 20 parts of potassium hydroxide. The solution is maintained at the boil for 12 hours, during which it turns yellow-brown in colour. Subsequently it is diluted with 200 parts of water and acidified with concentrated hydrochloric acid until it reacts acids to Congo Red paper. The precipitated brown dye is suctioned off, washed with water and dried.

9 parts of this dye are dissolved with 3 parts of cobalt sulphate heptahydrate in 115 parts of formamide. The solution is held for 1 hour at 120° and then diluted with 10 parts of water. The cobalt-containing dye settles out and is suctioned off, washed with water and stirred into 90 parts of 10% sodium hydroxide solution with heating. When everything has dissolved it is salted out with 18 parts of sodium chloride, suctioned off, washed with 20% sodium chloride solution, dried and ground. It is obtained as a dark powder which dissolves in water to give grey solution and dyes wool, silk and polyamide fibres in fast grey shades.

EXAMPLE 2

30.4 parts of 2-amino-N-acetyl-methylsulphonyl-1,1'-diphenylamine are dissolved in 50 parts of methanol. 30 parts of 30% hydrochloric acid and 500 parts of water are added to the solution, after which it is diazotised at 0–5° with 6.9 parts of sodium nitrite. The pale yellow diazo solution is adjusted to pH 4 with sodium acetate, on which an alkaline solution of 14.4 parts of 2-hydroxynaphthalene is slowly added so that the pH of the coupling solution is from 4 to 5. The temperature is about 0° to 10° The dye settles out with an orange-red colour and when the coupling reaction is complete it is suctioned off, washed and dried.

24 parts of the dry dye are dissolved in 300 parts of methanol, and after the addition of 8 parts of potassium hydroxide the solution is stirred for 4 hours at the boil with reflux until the acetyl group is split off. The wine-red dye solution is run into water and the precipitated dye filtered off and washed. 14 parts of the dye are dissolved in 280 parts of dimethyl formamide and 4.7 parts of cobalt sulphate heptahydrate. The solution is held at 120° for 1 hour, then 1000 parts of 5% hydrochloric acid are added, causing the 1:2 metal complex dye to precipitate. It is suctioned off and washed with water. The still moist dye paste is stirred in a 5% sodium hydroxide solution for 2 hours, suctioned off and dried. It is obtained as a dark blue powder which goes into solution in organic solvents and water with a blue coloration and dyes wool, silk and polyamide fibres in fast navy blue shades. The 2-amino-N-acetyl-4-methylsuphonyl-1,1'-diphenylamine can be produced as follows: 536 parts of 2-nitro-4-methylsulphonyl-1,1'-diphenylamine in 1700 parts of acetic anhydride are heated to the boil, on which 50 parts of freshly melted zinc chloride are carefully added. Boiling is continued for 1 hour with reflux. The reaction product is run in a thin jet into 5000 parts of water at 80° with stirring, which is continued until the mixture has cooled to room temperature. The product settles out and is suctioned off and dried. 33.4 parts of 2-nitro-N-acetyl-4-methylsulphonyl-1,1'-diphenylamine are dissolved in 50:50 water: ethanol solution. 10 parts of Raney nickel are added and hydration carried out with hydrogen at 40° and normal pressure. On complete reduction of the nitro group the alcoholic solution is evaporated to dryness. The amino compound thus formed is suitable for the production of azo dyes.

Dyeing example 1 part of the cobalt-containing dye disclosed in Example 2 is dissolved in 6000 parts of water of 40° with the addition of 3 parts of ammonium sulphate. 100 parts of wool are entered into this dyebath, which is then raised to 100° in about 30 minutes. The wool is dyed for 1 hour at the boil, the water lost by evaporation being replaced from time to time and is subsequently removed, rinsed with water and dried. It is dyed in a level navy shade with very good fastness to washing and milling and good light fastness. Nylon and other polyamide fibres can be dyed by the same method.

The following table contains particulars of further dyes which are obtainable in accordance with the present invention. In the metal-free state they have the formula:

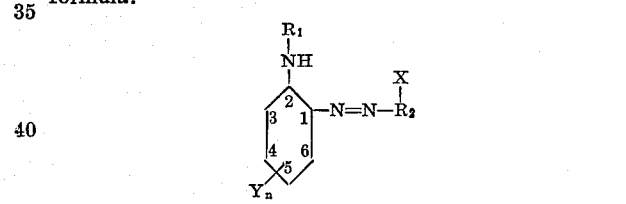

In the table they are distinguished by the meanings of $R_1$, $R_2$, X and $Y_n$ ($n=1$ or 2), the position of Y and the shade of the metallised dyeing on wool.

| Example No. | $R_1$ | $-\overset{X}{\underset{}{R_2}}$ | $Y_n$ | Shade |
|---|---|---|---|---|
| 3 | Phenyl | 2-hydroxynaphthyl-1 | H | Grey. |
| 4 | do | 2-hydroxy-6-aminosulphonylnaphthyl-1 | H | Do. |
| 5 | 4-chlorophenyl | do | H | Do. |
| 6 | Phenyl | 1-(4'-sulfophenyl)-3-methyl-5-pyrazonyl-4 | H | Olive. |
| 7 | do | 2-hydroxynaphthyl-1 | 4-methylsulphonyl | Blue-grey. |
| 8 | do | do | 4-acetylaminosulphonyl | Do. |
| 9 | —CH$_3$ | do | (5)—S O$_2$—CH$_3$ | Do. |
| 10 | —C$_2$H$_5$ | do | (4)—S O$_3$H | Do. |
| 11 | —CH$_2$—CH$_2$—O H | do | (5)—C O O H | Do. |
| 12 | —CH$_2$—CH$_2$—O CH$_3$ | do | (3)—S O$_2$NH$_2$—(5)—Cl | Do. |
| 13 | —CH$_2$—CH$_2$—CH$_2$O C$_2$H$_5$ | do | (3)—S O$_2$N(CH$_3$—(5)—Cl)(H) | Do. |
| 14 | —CH$_2$—C$_6$H$_5$ | 2-hydroxynaphthyl (—OH) | (5)—S O$_2$—N(CH$_3$)(CH$_3$) | Do. |
| 15 | —CH$_2$—C$_6$H$_4$—NO$_2$ | Same as above | (4)—S O$_2$—NH(C$_2$H$_4$OH)(H) | Do. |

| Example No. | R₁ | $\begin{array}{c}X\\-R_2\end{array}$ | $Y_n$ | Shade |
|---|---|---|---|---|
| 16 |  |  | (5)—CH₃ | Blue-grey. |
| 17 | /> | | | |
| 18 |  |  | (4)—OC₂H₅ | Blue. |
| 19 |  | Same as above | (5)—NO₂ | Do. |
| 20 |  | do | (5)—Cl | Do. |
| 21 |  | do | (4)—Br | Do. |
| 22 |  |  | (3)—F—(5)—Cl | Do. |
| 23 |  | Same as above | (5)—OH | Do. |
| 24 |  |  | (4)—C₂H₅ | Do. |
| 25 |  | Same as above | (5)—COOCH₃ | Grey. |
| 26 |  | do | (4)—CONHC₂H₅ | Do. |
| 27 |  |  | H | Blue. |
| 28 |  |  | H | Do. |
| 29 |  |  | H | Do. |
| 30 |  |  | H | Do. |

| Example No. | R₁ | $-\overset{X}{R_2}$ | Yₙ | Shade |
|---|---|---|---|---|
| 31 | —C₆H₄—SO₂CH₃ | methyl-naphthol (OH) | H | Blue. |
| 32 | —C₆H₃(NO₂)—SO₂NH₂ | methyl-naphthol (OH) | H | Do. |
| 33 | —C₆H₄—OC₂H₅ | naphthol with NH₂, OH, SO₃H | H | Do. |
| 34 | —C₆H₄—Br | naphthalene with CH₃CONH, OH, H₂N-O₂S, SO₂NH₂ | H | Do. |
| 35 | —C₆H₃(Cl)— | CH₃O—C₆H₄—HN—naphthol (OH, SO₃H) | H | Do. |
| 36 | —C₆H₄—NHCOC₂H₅ | C₆H₃(NH₂)(OH)CH₃ | (4)—SO₂CH₃ | Brown. |
| 37 | —C₆H₄—OCH₃ | C₆H₃(CH₃)(OH)(OH) | (4)—SO₂CH₃ | Do. |
| 38 | —C₆H₃(CH₃)(OCH₃) | CH₃—C₆H₂(CH₃)—OH | (5)—SO₂CH₃ | Do. |
| 39 | —C₆H₄—CN | naphthol (OH, OCH₃) | (5)—SO₂CH₃ | Blue. |
| 40 | —C₆H₄—C₂H₅ | methyl-naphthol (OH) | (5)—SO₂CH₃ | Do. |
| 41 | —C₆H₅ | C₆H₂(OH)(NHCOCH₃)(CH₃) | (5)—SO₂CH₃ | Brown. |
| 42 | —C₆H₅ | C₆H₃(OH)(OH) | (5)—SO₂CH₃ | Do. |

| Example No. | R₁ | $\overset{X}{\underset{}{-R_2}}$ | Yₙ | Shade |
|---|---|---|---|---|
| 43 | —⟨phenyl⟩ | naphthyl with OH, CH₃, OCH₃ | (5)—SO₃CH₃ | Navy blue. |
| 44 | ...do... | naphthyl with OH, Cl, CH₃, Cl | ...do... | Do. |
| 45 | ...do... | naphthyl with CH₃CONH, CH₃, OH | ...do... | Do. |
| 46 | ...do... | naphthyl with CH₃—SO₂—NH, CH₃, OH | ...do... | Do. |
| 47 | ...do... | naphthyl with OH, CH₃, SO₃H | H | Do. |
| 48 | ...do... | naphthyl with OH, CH₃, SO₃H | H | Do. |
| 49 | ...do... | naphthyl with CH₃, OH, SO₃H | H | Do. |
| 50 | ...do... | naphthyl with CH₃, OH, HO₃S | H | Do. |
| 51 | ...do... | naphthyl with CH₃, OH, HO₃S | H | Do. |
| 52 | ...do... | naphthyl with CH₃, OH, H₂N—O₂S | H | Blue. |
| 53 | ...do... | naphthyl with CH₃, OH, NH₂SO₂ | H | Do. |

| Example No. | R₁ | $\begin{matrix}X\\-R_2\end{matrix}$ | Yₙ | Shade |
|---|---|---|---|---|
| 54 |  | 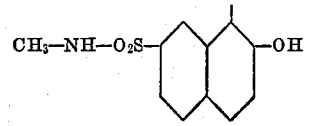 | H | Blue. |
| 55 | ....do.... | 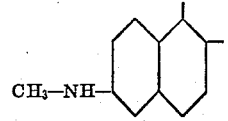 | (5)SO₂CH₃ | Do. |
| 56 | ....do.... | 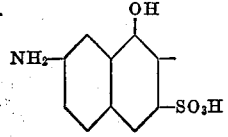 | H | Do. |
| 57 | ....do.... | 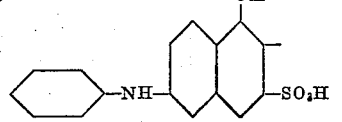 | H | Do. |
| 58 | ....do.... | 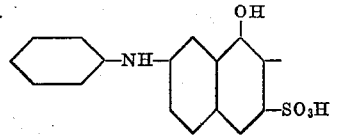 | H | Do. |
| 59 | ....do.... |  | H | Do. |
| 60 | ....do.... | 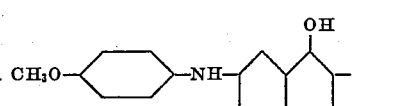 | H | Do. |
| 61 | ....do.... | 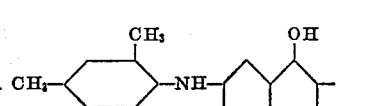 | H | Do. |
| 62 | ....do.... | 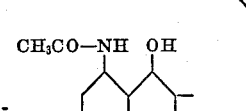 | H | Do. |
| 63 | ....do.... | 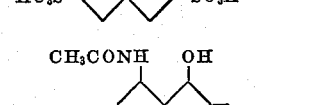 | H | Do. |
| 64 | ....do.... | 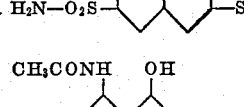 | H | Do. |

| Example No. | $R_1$ | $\overset{X}{\underset{-R_2}{\phantom{R}}}$ | $Y_n$ | Shade |
|---|---|---|---|---|
| 65 | 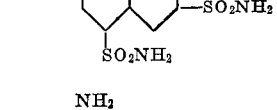 |  structure with CH₃CONH, OH, SO₂NH₂, SO₂NH₂ | H | Blue. |
| 66 | do | structure with NH₂ and SO₃H | H | Do. |
| 67 | do | cyclohexane with NH₂ and NH₂ | (5)SO₂CH₃ | Brown. |
| 68 | do | SO₃H—naphthalene—NH₂ with OH | H | Blue. |
| 69 | do | SO₃H—naphthalene—NH—phenyl with OH | H | Do. |
| 70 | do | HO₃S—naphthalene—NHCH₃ with OH | H | Do. |
| 71 | do | OH, SO₃H—naphthalene—NH₂ | (5) SO₂CH₃ | Do. |
| 72 | do | OH, SO₃H—naphthalene—NH—phenyl | Same as above | Do. |
| 73 | do | OH, SO₃H—naphthalene—NH—(2,4,6-trimethylphenyl) | H | Do. |

| Example No. | R₁ | X<br>—R₂ | Yₙ | Shade |
|---|---|---|---|---|
| 74 | 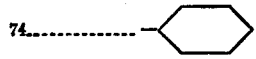 | 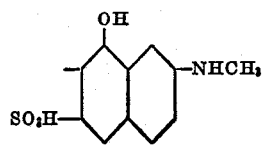 | H | Blue. |
| 75 | do | 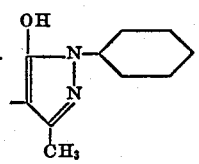 | ( )—SO₂CH₃ | Olive. |
| 76 | do | 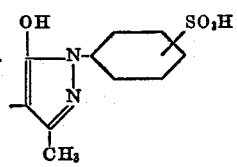 | H | Do. |
| 77 | do | 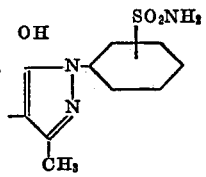 | H | Do |
| 78 | do | 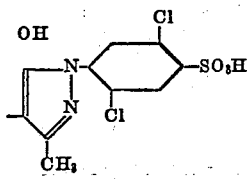 | H | Do. |
| 79 | do | 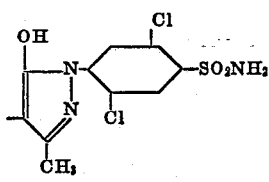 | H | Do. |
| 80 | do | 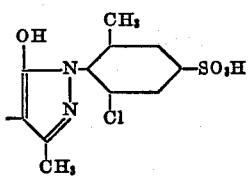 | H | Do. |
| 81 | do | 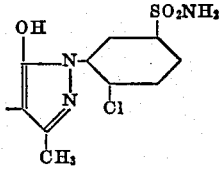 | H | Do. |
| 82 | do | 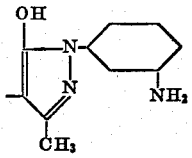 | (5)—SO₂CH₃ | Do. |
| 83 | do | 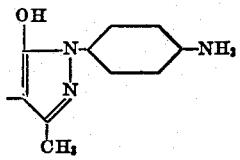 | Same as above | Do. |

| Example No. | R₁ | $-\overset{X}{R_2}$ | Y_n | Shade |
|---|---|---|---|---|
| 84 | 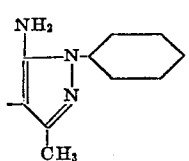 | 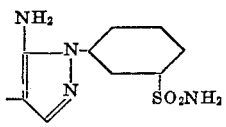 | (5) SO₂CH₃ | Olive. |
| 85 | do | 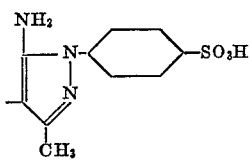 | H | Do. |
| 86 | do | 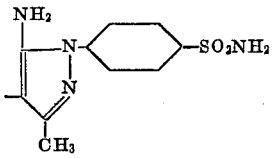 | H | Do. |
| 87 | do | 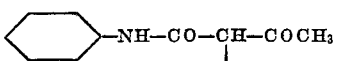 | H | Do. |
| 88 | do | 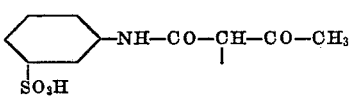 | (5)—SO₂CH₃ | Do. |
| 89 | do | 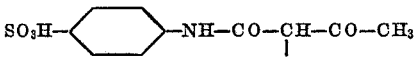 | H | Do. |
| 90 | do | 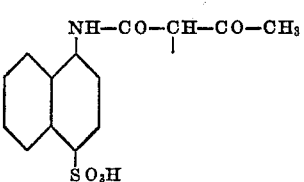 | H | Do. |
| 91 | do | 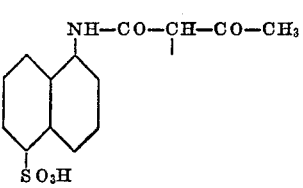 | H | Do. |
| 92 | do | 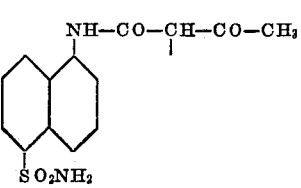 | H | Do. |
| 93 | do | 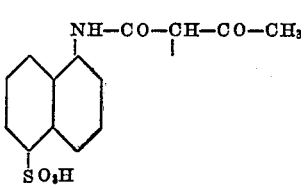 | H | Do. |
| 94 | do | 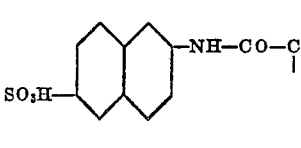 | H | Do. |
| 95 | do | 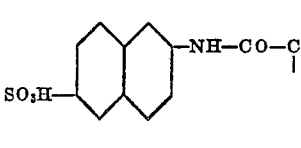 | H | Do. |

3,514,439

| Example No. | R₁ | $-\overset{X}{\underset{}{R_2}}$ | Yₙ | Shade |
|---|---|---|---|---|
| 96 | —⬡ | SO₃H—[naphthyl]—NH—CO—CH—CO—CH₃ | H | Olive. |
| 97 | do | CH₃—CO—CH—CONH—CH—C₅H₁₁ <br>                                             C₂H₅ | (4) SO₂CH₃ | Do. |
| 98 | do | CH₃—CO—CH—CO—NH—C₄H₉ | (5)—SO₂CH₃ | Blue. |
| 99 | —⬡—CH₃ | [naphthyl]—OH | Same as above | Do. |
| 100 | —⬡—OC₂H₅ | Same as above | do | Do. |
| 101 | —⬡ with CH₃ and OCH₃ | do | do | Do. |
| 102 | —⬡—NHCO—CH₃ | do | do | Do. |
| 103 | —⬡—Cl | do | do | Do. |
| 104 | —⬡—CN | do | do | Do. |
| 105 | —⬡ with CH₃ and CH₃ | do | do | Do. |
| 106 | —[naphthyl] | do | do | Do. |
| 107 | —⬡ | do | (3)—CH₃—(5)—SO₃H | Navy blue. |

EXAMPLE 108

20.5 parts of 1-amino-2-chloro-5-methylsulphonylbenzene are diazotised with 6.9 parts of sodium nitrite and 30 parts of 30% hydrochloric acid, and the diazo compound coupled in acetic acid solution with 14.4 parts of 2-hydroxynaphthalene. The resulting orange-red azo compound is filtered off, washed and dried. 36 parts of it are dissolved in 150 parts of dimethyl formamide, with the subsequent addition of 5 parts of copper sulphate crystals, 15 parts of 1-amino-4-ethoxybenzene and 10 parts of anhydrous sodium carbonate. The reaction solution is raised to 100° and maintained at this temperature for 2 hours. It is then adjusted acid to Congo paper with 2-normal sulphuric acid and boiled for a further 2 hours with reflux. The dye settles out and is filtered off, washed and dried. It is free from copper and is converted into the 1:2 cobalt complex compound according to the procedure of Example 1. In this form it dyes wool and nylon in fast navy blue shades. In the metal-free form it has the formula:

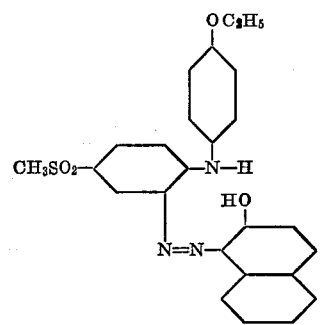

Formulae of representative dyes of the foregoing examples are as follows:

Example 2.—The 1:2-cobalt complex compound of the azo dye of the formula:

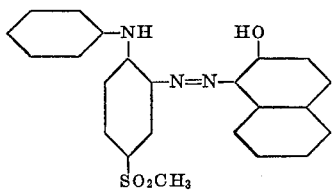

Example 41.—The 1:2-cobalt complex compound of the azo dye of the formula:

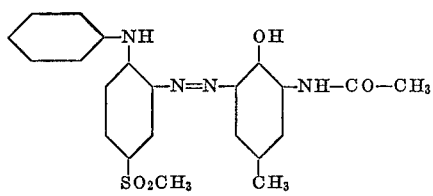

Example 43.—The 1:2-cobalt complex compound of the azo dye of the formula:

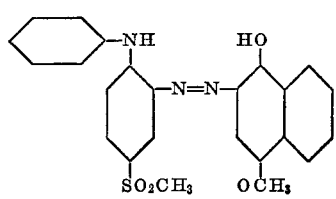

Example 45.—The 1:2-cobalt complex compound of the azo dye of the formula:

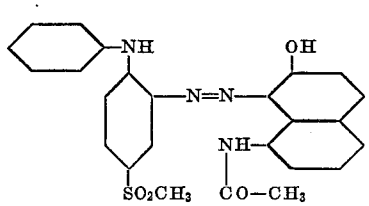

Example 53.—The 1:2-cobalt complex compound of the azo dye of the formula:

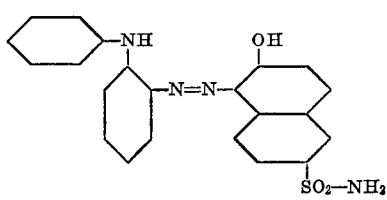

Example 75.—The 1:2-cobalt complex compound of the azo dye of the formula:

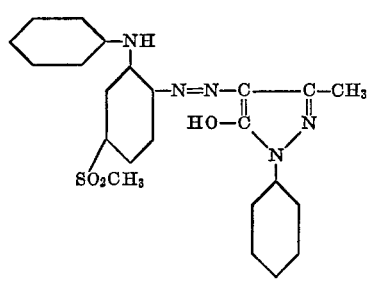

Having thus disclosed the invention what we claim is:

1. A homogeneous 1:2-cobalt complex of a monoazo dye of the formula:

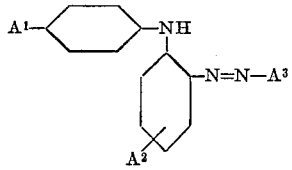

wherein:

$A^1$ is a member selected from the group consisting of hydrogen and ethoxy;

$A^2$ is para to either the amino or the azo group and is a member selected from the group consisting of hydrogen and methylsulfonyl; and $A^3$ is a member selected from the group consisting of 2-hydroxynaphthyl - 1,6-aminosulfonyl-2-hydroxynaphthyl - 1,2 - hydroxy-8-methylcarbonylaminonaphthyl-1, 2 - hydroxy - 8 - methylcarbonylaminonaphthyl-1,2-hydroxy-5-methyl-3-methylcarbonylaminophenyl, 1-hydroxy - 4 - methoxynaphthyl-2 and 3-methyl-1-phenyl-5-pyrazolonyl-4.

2. The complex according to claim 1 of the dye of the formula:

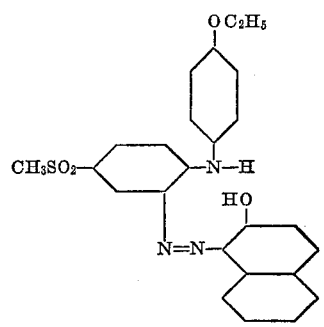

3. The complex according to claim 1 of the dye of the formula:

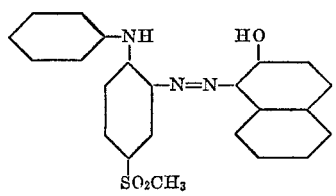

4. The complex according to claim 1 of the dye of the formula:

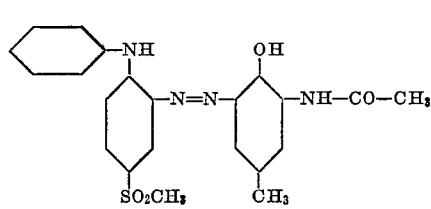

5. The complex according to claim 1 of the dye of the formula:

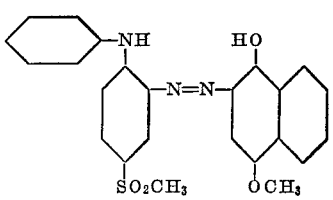

6. The complex according to claim 1 of the dye of the formula:
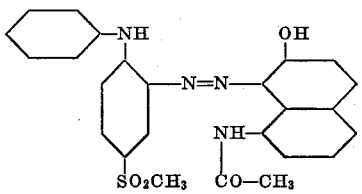
7. The complex according to claim 1 of the dye of the formula:
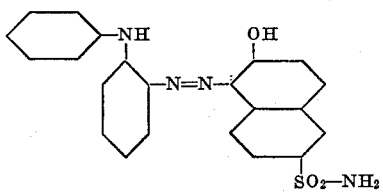
8. The complex according to claim 1 of the dye of the formula:
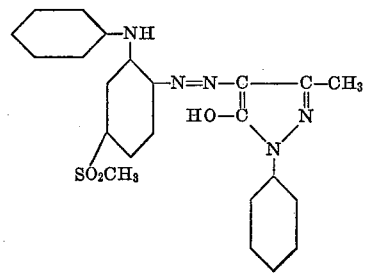
References Cited
UNITED STATES PATENTS
| | | | |
|---|---|---|---|
| 2,529,444 | 11/1950 | Bestehorn et al. | 260—149 |
| 2,824,094 | 2/1958 | Ackermann et al. | 260—146 |
| 2,839,520 | 6/1958 | Neier | 260—149 X |
| 3,040,019 | 6/1962 | Neier | 260—151 X |
| 3,169,123 | 2/1965 | Neier | 260—151 X |
FLOYD DALE HIGEL, Primary Examiner
U.S. Cl. X.R.
8—42, 43; 260—149, 151, 162, 193, 197, 199, 200, 201, 202

UNITED STATES PATENT OFFICE
CERTIFICATE OF CORRECTION

Patent No. 3,514,439          Dated May 26, 1970

Inventor(s) WALTER WEHRLI and HEINZ WICKI

It is certified that error appears in the above-identified patent and that said Letters Patent are hereby corrected as shown below:

Column 1, line 60, in the formula, "  " should read --  --.

Column 2, line 27, "amino" should read --amine--. Column 3, line 1, "amino," should read --amino-,--; line 7, "phenylamino-1" should read --phenylamino- --; line 14, "sulphonicacid" should read --sulphonic acid--; line 16, "aminapyrazole" should read --aminopyrazole---; line 45, "COOH" should read -- --COOH--; line 56, "400" should read --40--; line 61, "salt" should read --salt,--; line 67, in the formula, " 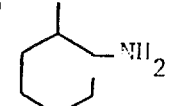 " should read -- 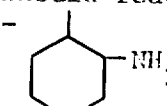 --.

Column 5, line 29, "10°" should read --10°.---. Column 6, line 3, "methylsuphonyl" should read --methylsulphonyl--. Column 15, in the formula of Example No. 69, " 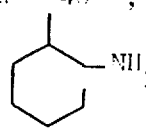 " should read -- 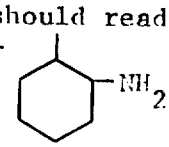 --; in the formula of Example No. 72, " 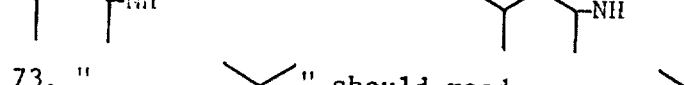 " should read -- 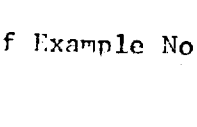 --;

in the formula of Example No. 73, " 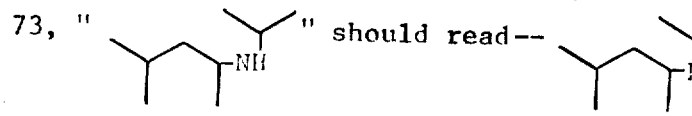 " should read-- 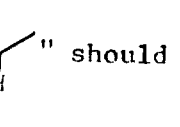 --.

Column 17, in the formula of Example No. 77, "OH " should read

--OH --; in the formula of Example No. 78, "OH " should read
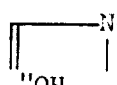

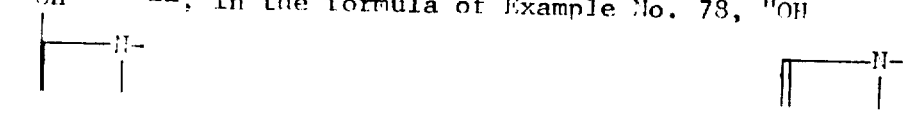

FORM PO-1050 (10-69)

UNITED STATES PATENT OFFICE
CERTIFICATE OF CORRECTION

Patent No. 3,514,430  Dated May 26, 1970

Inventor(s) WALTER WEHRLI and HEINZ WICKI    PAGE - 2

It is certified that error appears in the above-identified patent and that said Letters Patent are hereby corrected as shown below:

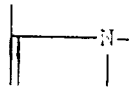--. Column 18, Example 75, "( )" should read --(4)--. Column 19, in the formula of Example 94, "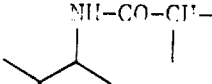" should read --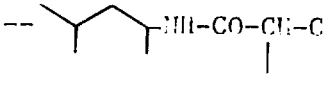--. Column 23, line 35, in the formula, "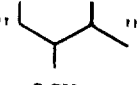"

should read --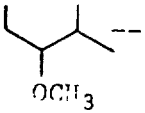--. Column 24, line 19, "1,6" should read --1, 6--; line 20, "1,2" should read --1, 2--; line 21, delete "2-hydroxy-8-methylcarbonylaminonaphthyl-1,".

Signed and sealed this 10th day of November 1970.

(SEAL)
Attest:

EDWARD M. FLETCHER, JR.  
Attesting Officer

WILLIAM E. SCHUYLER, JR.  
Commissioner of Patents